US010427253B2

(12) United States Patent
Deiss et al.

(10) Patent No.: US 10,427,253 B2
(45) Date of Patent: Oct. 1, 2019

(54) MACHINE TOOL HAVING A WORKPIECE SUPPORT AND METHOD FOR LOADING AND UNLOADING A WORKPIECE SUPPORT OF A MACHINE TOOL

(71) Applicant: TRUMPF Werkzeugmaschinen GmbH + Co. KG, Ditzingen (DE)

(72) Inventors: Magnus Deiss, Stuttgart (DE); Peter Epperlein, Leonberg (DE); Heinz-Juergen Prokop, Essen (DE); Frank Schmauder, Metzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 132 days.

(21) Appl. No.: 15/788,439

(22) Filed: Oct. 19, 2017

(65) Prior Publication Data

US 2018/0043479 A1 Feb. 15, 2018

Related U.S. Application Data

(63) Continuation of application No. PCT/EP2016/058550, filed on Apr. 18, 2016.

(30) Foreign Application Priority Data

Apr. 20, 2015 (DE) .......................... 10 2015 207 122

(51) Int. Cl.
*B23K 37/04* (2006.01)
*B23Q 7/04* (2006.01)
(Continued)

(52) U.S. Cl.
CPC ........ *B23K 37/0235* (2013.01); *B23K 37/047* (2013.01); *B23K 37/0408* (2013.01);
(Continued)

(58) Field of Classification Search
CPC ....... B23K 37/0408; B23Q 7/04–7/048; B23Q 2240/002; B21D 43/10–43/11;
(Continued)

(56) References Cited

U.S. PATENT DOCUMENTS 4,348,252 A   9/1982  Knoop et al.
5,765,984 A   6/1998  Stefano et al.
(Continued)

FOREIGN PATENT DOCUMENTS

CN   101715381   5/2010
CN   103874560   6/2014
(Continued)

OTHER PUBLICATIONS

International Search Report for PCT Application No. PCT/EP2016/058550, dated Sep. 20, 2016, 4 pages.

*Primary Examiner* — Erica E Cadugan
(74) *Attorney, Agent, or Firm* — Fish & Richardson P.C.

(57) ABSTRACT

A method and a machine tool for processing workpieces is described, comprising a workpiece movement device and a workpiece support that supports both a workpiece during a processing operation and a workpiece remainder produced from the workpiece during the processing operation, wherein the workpiece support comprises a first support portion and an additional support portion, wherein the first support portion comprises a loading-side support portion arranged in a loading region of the machine tool, wherein the additional support portion is arranged to move relative to the loading-side support portion between the loading region and an unloading region of the machine tool, wherein the unloading region is offset in a horizontal direction from the loading region, wherein the loading-side support portion is
(Continued)

arranged to move in a vertical direction between a loading level and a bypass level located above or below the loading level.

13 Claims, 9 Drawing Sheets

(51) Int. Cl.
| | | |
|---|---|---|
| *B23K 37/02* | (2006.01) | |
| *B23K 37/047* | (2006.01) | |
| *B23K 26/36* | (2014.01) | |
| *B23P 23/04* | (2006.01) | |
| *B26D 7/01* | (2006.01) | |
| *B65H 3/08* | (2006.01) | |
| *B65H 5/08* | (2006.01) | |
| *B23K 26/00* | (2014.01) | |
| *B65G 59/04* | (2006.01) | |
| *B21D 43/24* | (2006.01) | |

(52) U.S. Cl.
CPC ............... *B23Q 7/04* (2013.01); *B21D 43/24* (2013.01); *B23K 26/0093* (2013.01); *B23P 23/04* (2013.01); *B23Q 2240/002* (2013.01); *B26D 7/015* (2013.01); *B26D 2007/011* (2013.01); *B65G 59/04* (2013.01); *B65H 3/0816* (2013.01); *B65H 5/08* (2013.01)

(58) Field of Classification Search
CPC ...... B21D 43/24; B26D 7/015; B26D 7/0675; B65G 59/04; B65H 3/0808; B65H 3/0816; B65H 5/08–5/14
USPC ........... 414/797; 198/468.4; 271/3.14, 5, 97, 271/103
See application file for complete search history.

(56) References Cited

U.S. PATENT DOCUMENTS

| | | |
|---|---|---|
| 6,179,547 B1 | 1/2001 | Hayakawa |
| 8,590,135 B2 | 11/2013 | Jost et al. |
| 9,623,531 B2 | 4/2017 | Bytow et al. |
| 2003/0147729 A1 | 8/2003 | Leibinger et al. |
| 2010/0296905 A1* | 11/2010 | Mossi ................. B21D 43/105 414/737 |
| 2014/0112744 A1* | 4/2014 | Bauch .................... B21D 43/06 414/226.02 |
| 2014/0216223 A1* | 8/2014 | Epperlein .......... B23K 37/0408 83/23 |
| 2019/0091754 A1* | 3/2019 | Deiss .................... B21D 28/00 |

FOREIGN PATENT DOCUMENTS

| | | |
|---|---|---|
| CN | 104014677 | 9/2014 |
| DE | 69611976 T2 | 7/2001 |
| DE | 69723862 T2 | 5/2004 |
| EP | 0331661 A1 | 9/1989 |
| EP | 1935526 A1 | 6/2008 |
| EP | 2444174 A1 | 4/2012 |
| JP | 04351235 A | 12/1992 |
| JP | 09277077 A | 10/1997 |
| JP | 2001018140 A | 1/2001 |
| JP | 2002066666 A | 3/2002 |

* cited by examiner

Fig. 17 ions described in claim 1 are also achieved with the machine tool according to the disclosure and also allow the handling device, which is arranged beside the machine tool and/or that is exclusively provided to load and unload the workpiece support, to be omitted.

MACHINE TOOL HAVING A WORKPIECE SUPPORT AND METHOD FOR LOADING AND UNLOADING A WORKPIECE SUPPORT OF A MACHINE TOOL

CROSS-REFERENCE TO RELATED APPLICATIONS

This application is a continuation of and claims priority under 35 U.S.C. § 120 from PCT Application No. PCT/EP2016/058550 filed on Apr. 18, 2016, which claims priority from German Application No. 10 2015 207 122.7, filed on Apr. 20, 2015. The entire contents of each of these priority applications are incorporated herein by reference.

TECHNICAL FIELD

The disclosure relates to a machine tool for processing workpieces and a method for loading and unloading a workpiece support of a machine tool for processing workpieces.

BACKGROUND

Generic prior art is disclosed in US 2003/0147729 A1. This document relates to a machine tool having a workpiece support that is unloaded by a handling device arranged beside a workpiece support. The workpiece support supports a workpiece that is intended to be processed and can together move in a throat region of a machine frame of a machine tool along an upper and a lower frame leg. The workpiece is moved transversely relative to the movement direction of the workpiece support by clamping claws that fix the workpiece and that together with the workpiece move transversely relative to the movement direction of the workpiece support. The workpiece to be processed is positioned in the manner required for the processing operation in a horizontal plane with respect to a processing tool of the machine tool.

The workpiece support of the previously known machine tool is divided in two portions, wherein a separation gap extends in the longitudinal direction of the lower frame leg between the two support portions at the height of the processing tool provided on the lower frame member. One of the support portions is associated with the handling device and accordingly forms an unloading-side support portion.

After the processing of a workpiece, a processed product that has been produced during the workpiece processing operation is moved by the movable clamping claws onto the unloading-side support portion. Together with the processed product, the unloading-side support portion moves over a horizontal platform of the handling device. Subsequently, the processed product is gripped by a gripper of the handling device and the unloading-side support portion is moved away from the handling device and in this instance pulled out below the processed product. The processed product is consequently under the action of gravitational force placed on the horizontal platform of the handling device arranged below the processed product.

SUMMARY

The machine tool for processing workpieces has a workpiece support for supporting a workpiece during a processing operation of the workpiece and for supporting a processed product, which is produced from the workpiece during the processing operation of the workpiece, wherein the workpiece support has a first support portion and an additional support portion, and a workpiece movement device.

The disclosure further relates to methods for loading and unloading a workpiece support of a machine tool for processing, e.g., plate-like, workpieces. The workpiece support has a first support portion and an additional support portion wherein a workpiece to be processed is supported by the workpiece support during a processing operation of the workpiece and a workpiece remainder, which is produced from the workpiece during the processing of the workpiece, is supported by the workpiece support and wherein the machine tool has a workpiece movement device.

Advantages of the present disclosure include that the new methods and systems simplify the prior art structures and methods.

To load and unload the machine tool described herein, an additional support portion in addition to a loading-side support portion of a workpiece support supports the workpiece during the workpiece processing operation, and subsequently supports the workpiece remainder, which has been produced from the workpiece. A handling device that is arranged beside the machine tool and/or that is provided exclusively to load and unload the workpiece support can consequently be omitted. The additional support portion moves during the loading operation into a receiving position relative to the loading-side support portion, which is arranged in a loading region of the machine tool. When in the receiving position, the additional support portion is below or above the loading-side support portion, which at this time is raised or lowered to a bypass level. When in the receiving position, the additional support portion may be loaded with a workpiece to be processed, for example, by using a loading device arranged above or below the loading-side support portion or which can be moved thereto.

After having received a workpiece to be processed, the additional support portion, which is now loaded with the workpiece, is moved from the receiving position in the loading region into an unloading region of the machine tool, which is offset in a horizontal direction with respect to the loading region. The loading-side support portion is lowered or raised from the bypass level onto a loading level while the additional support portion moves horizontally from the loading region into the unloading region of the machine tool or after the horizontal movement of the additional support portion has been completed.

The additional support portion loaded with the workpiece is also on the loading level. Consequently, the loading-side support portion and the additional support portion are in alignment with each other at the upper side thereof in a horizontal direction such that the workpiece, which is initially still supported exclusively on the additional support portion, can be moved by a workpiece movement device of the machine tool with a horizontal movement over the additional support portion and the loading-side support portion, and the workpiece support as a whole can thereby be loaded with the workpiece to be processed.

There now follows a workpiece processing operation, by which a workpiece remainder is produced from the workpiece. Processing movements of the workpiece may be produced by the workpiece movement device. The workpiece remainder is moved onto the additional support portion by the workpiece movement device, which additional support portion is still in the unloading region of the machine tool. The position assumed by the additional support portion in the unloading region of the machine tool forms an unloading starting position from which an unloading operation is carried out.

To unload the workpiece support, the additional support portion moves with an unloading movement from the unloading starting position in the unloading region back into the receiving position in the loading region of the machine tool. To enable the additional support portion to move into the receiving position, the loading-side support portion is previously raised or lowered from the loading level to the bypass level. The workpiece remainder, which is supported on the additional support portion after the workpiece processing operation, is not moved together with the unloading movement of the additional support portion. Instead, the workpiece remainder remains in the unloading region of the machine tool and the additional support portion carries out the unloading movement relative to the workpiece remainder, which, as a result of this relative movement, is unloaded from the additional support portion and consequently from the workpiece support. With the unloading of the workpiece remainder, the additional support portion reaches the receiving position and another loading operation can begin.

In some embodiments, the loading level of the loading-side support portion and the loading level of the additional support portion each constitutes an operating level. Consequently, directly after the loading of the workpiece support with a workpiece to be processed, the movement of the workpiece over the loading-side support portion and the additional support portion of the workpiece support can be initiated as required for processing.

In some embodiments, the bypass level of the loading-side support portion is located in a vertical direction above the loading level. The additional support portion in the receiving position is arranged below the loading-side support portion. A loading device by which the additional support portion can be loaded with a workpiece is positioned below the loading-side support portion and consequently in the intermediate space between the loading-side support portion which is raised to the bypass level and the additional support portion that is moved into the receiving position. This arrangement provides a compact construction.

In some embodiments, a workpiece store is also integrated in the loading region of the machine tool. The workpiece store is located below the loading-side support portion and below the additional support portion of the workpiece support which has been moved into the receiving position. Workpiece stores include, for example, the installation surface of the machine tool or a workpiece pallet that has been deposited on the installation surface of the machine tool. The loading device can be moved with a vertical lifting or lowering movement to a lower lifting level and to an upper lifting level. When at the lower lifting level, the loading device can receive a workpiece at the workpiece store. The loading device can already receive a new workpiece while a workpiece supported by the loading-side support portion and the additional support portion is processed. If the additional support portion is located in a position remote from the receiving position, the loading device can be raised with the workpiece which was previously received at the workpiece store from the lower lifting level to the upper lifting level. If the additional support portion is subsequently moved into the receiving position below the loading device and the workpiece received by the loading device, the workpiece can be transferred to the additional support portion by the loading device. The loading-side support portion is raised to the bypass level when the additional support portion is moved into the receiving position.

As a result of the workpiece store, the loading device, the additional support portion that is moved into the receiving position, and the loading-side support portion being arranged one above the other, the loading region of the machine tool can be accommodated on a small base area. This in turn results in a small base area requirement of the overall arrangement.

For increased simplicity, in some embodiments, the loading-side support portion that moves onto the bypass level and the loading device that moves onto the upper lifting level are coupled in terms of movement. The loading-side support portion can be moved onto the bypass level by the loading device that moves onto the upper lifting level. A single lifting drive is accordingly sufficient for producing both the lifting movement of the loading device and the lifting movement of the loading-side support portion. In some embodiments, the loading-side support portion is raised by the loading device from the machine body or placed on the machine body. The loading side support portion can, during the processing of a workpiece, be supported by a base member or a carrier structure of the machine tool in a low-vibration manner.

To ensure an operationally reliable transfer of the workpiece to be processed from the loading region into the unloading region of the machine tool, there is provided a workpiece retention device by which the workpiece to be processed can be secured during the movement of the additional support portion from the transfer position into the unloading region, relative to the additional support portion.

In other embodiments, the workpiece can be transferred to the workpiece retention device by the loading device which retains the workpiece and/or the additional support portion which supports the workpiece which is intended to be processed, on the one hand, and the workpiece retention device, on the other hand, being able to be moved relative to each other with a workpiece transfer movement. With the workpiece transfer movement which is carried out for this purpose, the workpiece is positioned relative to the workpiece retention device in such a manner that it can be securely fixed to the workpiece retention device.

In other embodiments, there is used as a workpiece retention device by which a workpiece is secured with respect to the additional support portion during the movement of the additional support portion from the receiving position into the unloading region of the machine tool, the workpiece movement device by which a workpiece that is moved with the additional support portion into the unloading region can be moved over the additional support portion and the loading-side support portion. The workpiece movement device can be moved for this purpose into a position associated with the receiving position of the additional support portion and in which the workpiece to be processed is fixed to the workpiece movement device. Subsequently, the workpiece movement device moves together with the additional support portion and the workpiece supported thereon into the unloading region of the machine tool. Since the instantaneous position of the workpiece movement device is defined in the coordinate system of the numerical control of the machine tool, this applies accordingly to the workpiece fixed to the workpiece movement device.

In some embodiments, a product retention device is provided on which the workpiece remainder produced during the workpiece processing operation is secured, during the unloading movement of the additional support portion, for remaining in the unloading region of the machine tool.

In some embodiments, the workpiece movement device is the product retention device.

In the interests of an operationally reliable unloading operation, in some embodiments an auxiliary unloading device is provided, by which the workpiece remainder can be released from the product retention device after the unloading movement of the additional support portion.

If below the additional support portion, which is arranged in the unloading starting position, a product store is provided, a workpiece remainder as a result of the unloading movement of the additional support portion can be transferred to the product store in a simple manner using gravitational force. Since the product store is located below the additional support portion that is moved into the unloading region of the machine tool, the unloading region of the machine tool requires only a small base area.

The invention is explained in greater detail below with reference to exemplary schematic illustrations.

DETAILED DESCRIPTION

Figure 1:
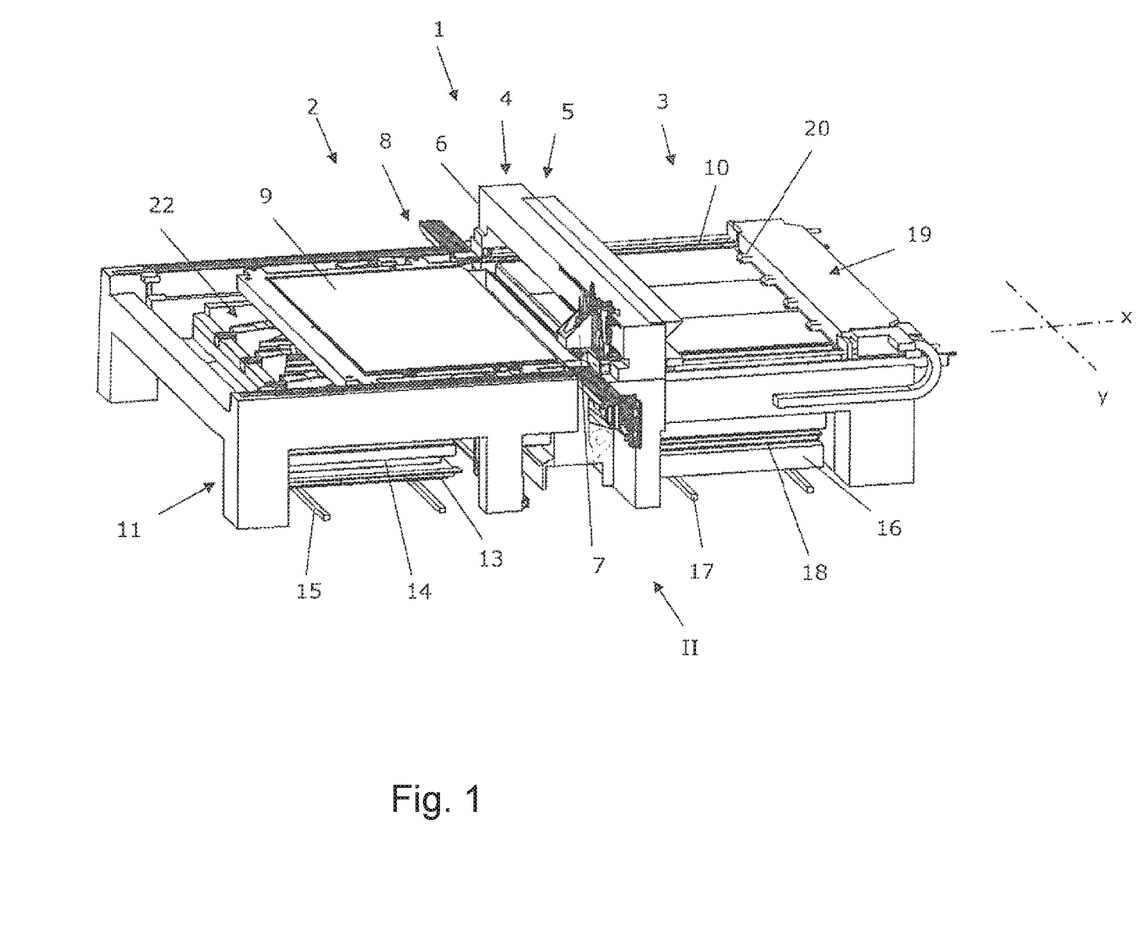
FIG. 1 shows a machine tool in the form of a laser cutting machine for cutting metal sheets with a two-part workpiece support.

FIG. 1 illustrates a laser cutting machine 1 as an example of a machine tool that has a loading region 2 and an unloading region 3. A processing station 4 is arranged between the loading region 2 and the unloading region 3. The processing station 4 includes a portal-like guiding structure 5 with a portal carrier 6. Along the portal carrier 6 a laser cutting head 7 can be moved in a first axial direction (the y direction). Laser welding machines, punching machines, or combined punching/laser cutting machines are other examples of machine tools.

Below the portal carrier 6 of the laser cutting machine 1, a workpiece support 8 extends out from both sides of the processing station 4. The workpiece support 8 is constructed in two parts and includes a loading-side support portion 9 and an additional support portion 10 which can be moved relative to the loading-side support portion 9 in a second axial direction (the x direction). In FIG. 1, the additional support portion 10 is arranged in the unloading region 3 of the laser cutting machine 1.

The loading-side support portion 9 is located on a frame-like carrier structure 11 of the laser cutting machine 1. A loading device concealed in FIG. 1 and which is constructed as a suction frame 12 (shown in FIG. 2) is arranged below the loading-side support portion 9. The suction frame 12 is arranged above a workpiece store, in the example illustrated above a blank sheet pallet 13. Workpieces to be processed, in the form of blank sheets 14, are stacked on the blank sheet pallet 13. The blank sheet pallet 13 can move between a position inside and a position outside the frame-like carrier structure 11 on rails 15.

In the unloading region 3 of the laser cutting machine 1, a skeleton pallet 16 acts as a product store and can be moved on rails 17 between a position inside the frame-like carrier structure 11 and a position outside the frame-like carrier structure 11 (see FIG. 1). The skeleton pallet 16 supports workpiece remainders left over from the processing, called skeletons 18. In some instances, workpiece remainders can refer to either a finished part or a residual grid left over from the processing.

As with the additional support portion 10, which is arranged in FIG. 1 above the skeleton pallet 16, a workpiece movement device 19 can be moved in a motor driven manner along the frame-like carrier structure 11 in the x direction. Clamping claws 20 of the workpiece movement device 19 are used for clamping a blank sheet 14 or a skeleton 18 on the workpiece movement device 19.

Figure 2:
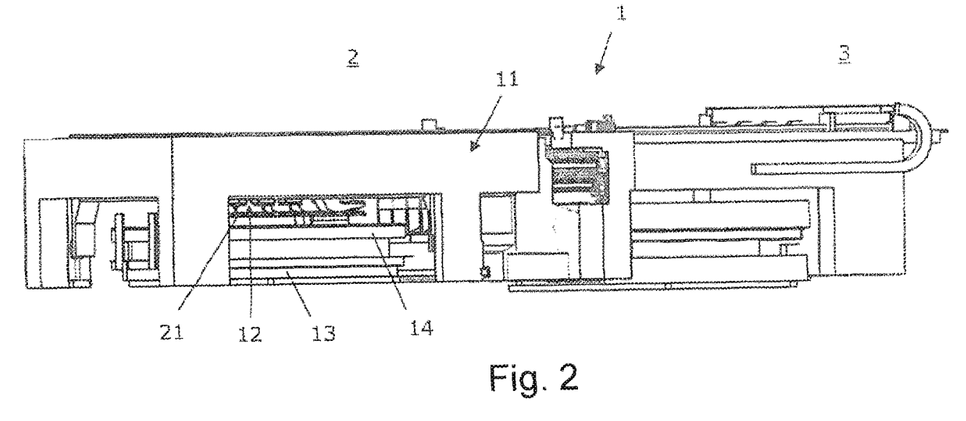
FIGS. 2 to 12 show the loading of the workpiece support of the laser cutting machine of FIG. 1.

FIG. 2 shows the laser cutting machine 1 in the operating state of FIG. 1 and in this instance in the plan view in the direction of the arrow II in FIG. 1. The portal carrier 6 and the laser cutting head 7 are not illustrated in FIG. 2 or in FIGS. 3 to 17 for reasons of clarity.

In FIG. 2 the suction frame 12 and suction cups 21 which are mounted to the suction frame 12 can be seen through an opening of the frame-like carrier structure 11. The suction cups 21 are of conventional construction. The suction cups 21 are spaced apart in the vertical direction from the blank sheet 14, which is placed uppermost on the blank sheet pallet 13.

Starting from this configuration, the suction frame 12 is lowered to such an extent that it is arranged on a lower lifting level and the suction cups 21 contact the uppermost blank sheet 14.

To move the suction frame 12 in a vertical direction, a lifting frame 22 (shown in FIG. 1) can be raised and lowered in a motorized manner on the frame-like carrier structure 11 of the laser cutting machine 1. The suction frame 12 is mounted to the lifting frame 22. The suction frame 12 can be positioned relative to the lifting frame 22 in the x direction.

Figure 3:
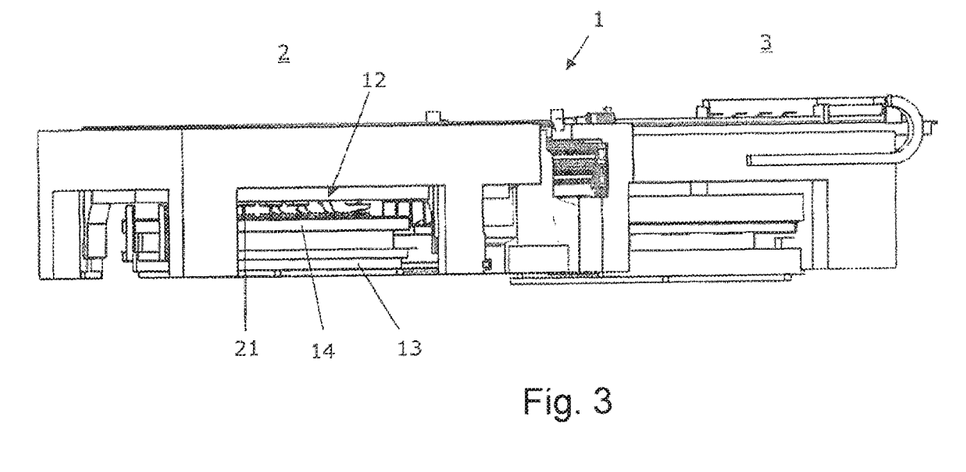

When the suction cups 21 are in abutment with the upper blank sheet 14 of the blank sheet stack supported on the blank sheet pallet 13, a vacuum is applied to the suction cups 21 and the blank sheet 14 which is acted on by the suction cups 21 is fixed to the suction frame 12 (FIG. 3).

Figure 4:
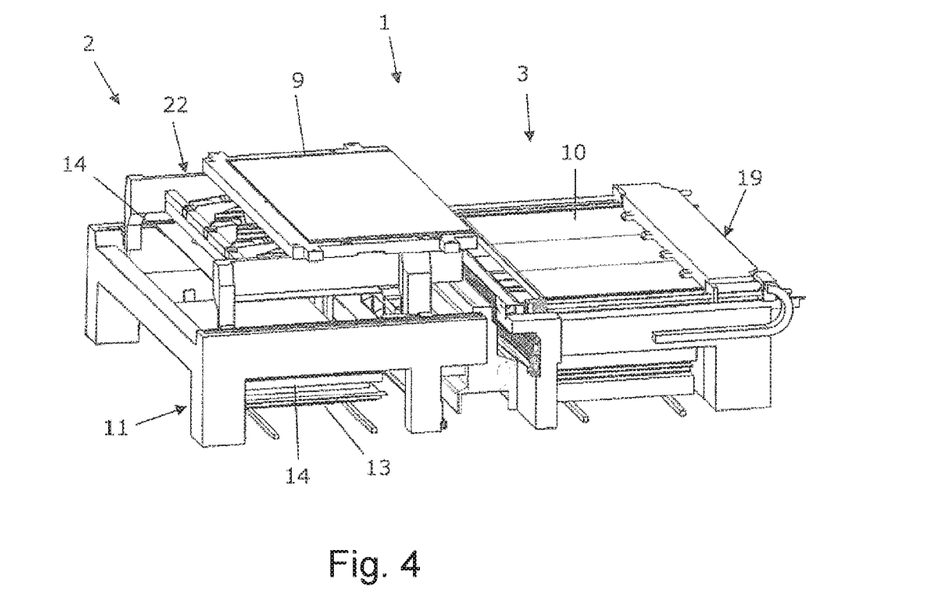

Subsequently, the suction frame 12 is lifted together with the blank sheet 14 which has been picked up by the suction frame 12 from the lower lifting level to an upper lifting level. As with the previously mentioned lowering movement, the movement of the suction frame 12 to the upper lifting level is also carried out by the lifting frame 22. With the lifting movement, which is carried out starting from the lower lifting level of the suction frame 12, the lifting frame 22 abuts with the upper side thereof against the lower side of the loading-side support portion 9. In the event of continued lifting movement of the lifting frame 22, the loading-side support portion 9 is raised from the frame-like carrier structure 11. Starting from the position of FIGS. 1 and 3, the loading-side support portion 9 is moved upwards to a bypass level (FIG. 4). When the loading-side support portion 9 is arranged on the bypass level, the blank sheet 14 which is retained on the suction frame 12 is located slightly higher than the additional support portion 10 which is located as before in the unloading region 3.

Figure 5:
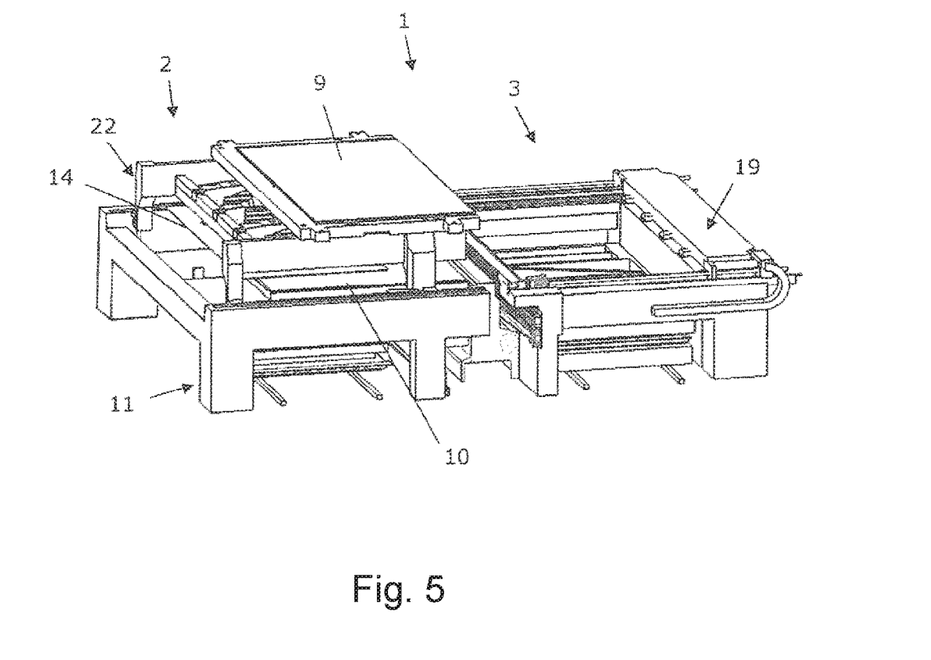

The additional support portion 10 can consequently move in the x direction from the unloading region 3 into a receiving position in which it is arranged in the loading region 2 below the loading-side support portion 9 and also below the suction frame 12 and the blank sheet 14 which is secured thereto on a loading level (FIG. 5).

Figure 6:
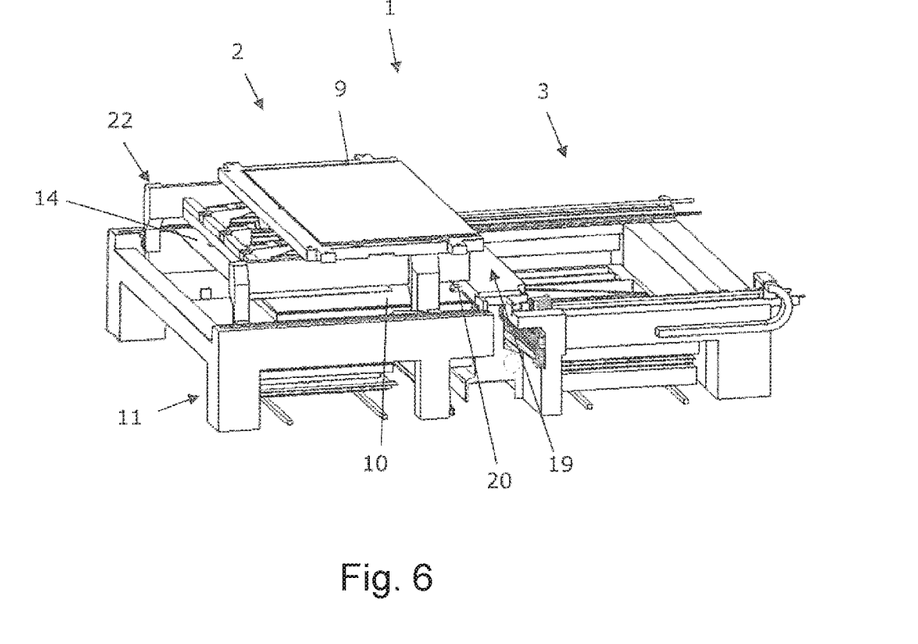

At the same time as, or immediately after as illustrated, the additional support portion 10, moves the workpiece movement device 19 from the unloading region 3 in the direction towards the loading region 2 (FIG. 6). The clamping claws 20 of the workpiece movement device 19 are open.

Figure 7:
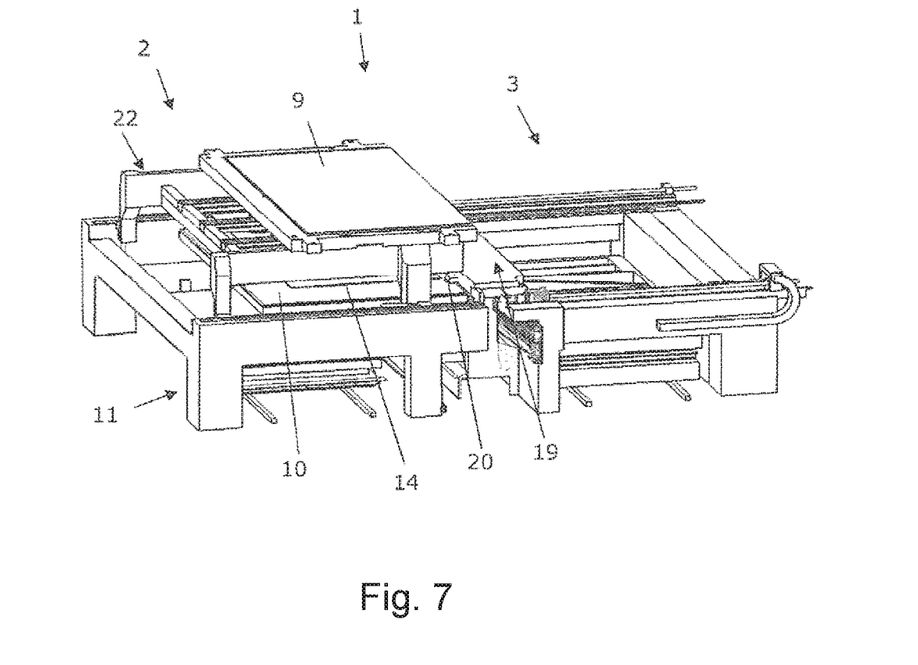
Figure 8:
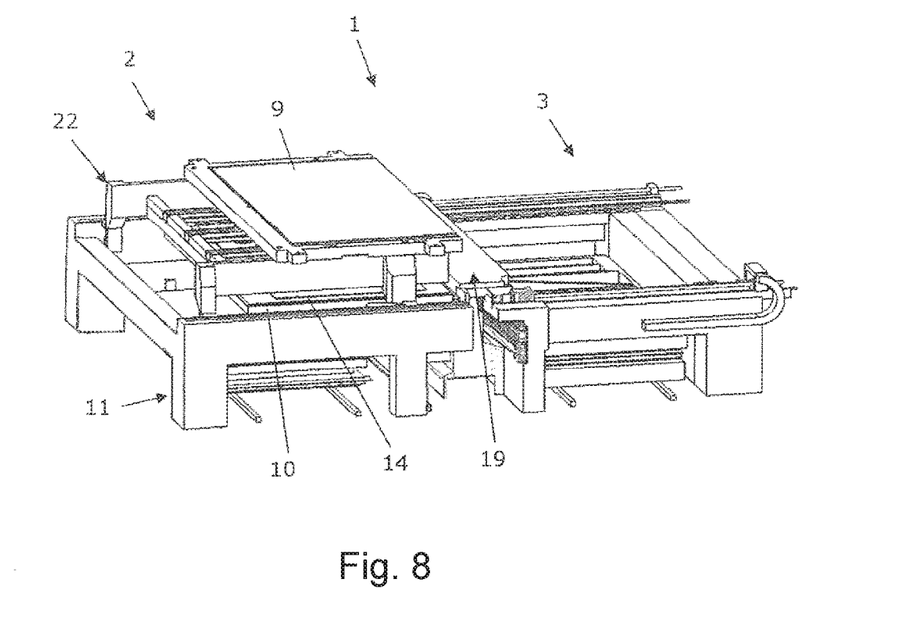
Figure 9:
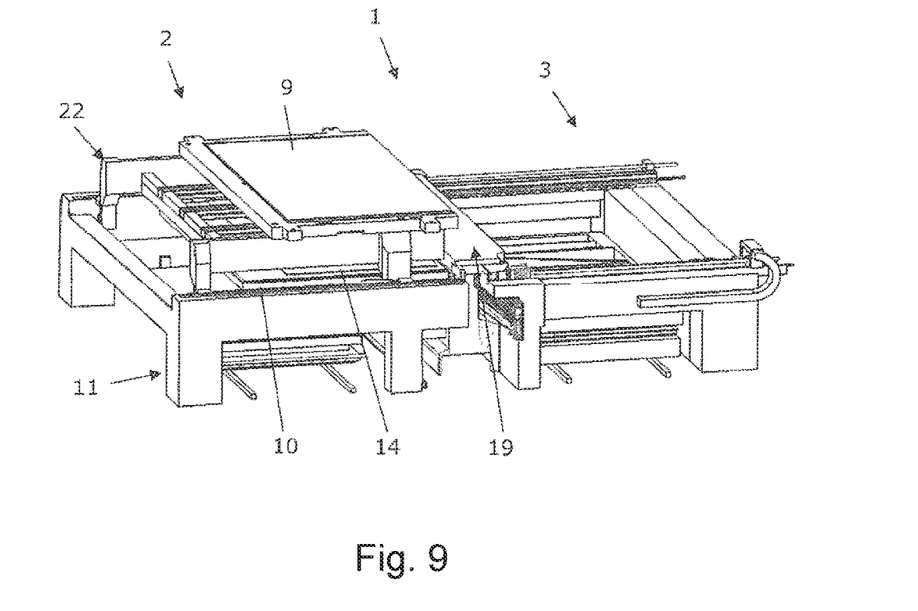

Now the suction frame 12 moves together with the blank sheet 14 which is held by the suction cups 21 relative to the lifting frame 22 in the x direction and towards the workpiece movement device 19 (FIG. 7). With a short lowering movement, the lifting frame 22 is then lowered until the blank sheet 14 which is secured to the suction frame 12 comes to rest on the additional support portion 10 (FIG. 8). Afterwards, the suction frame 12 moves again with the blank sheet 14 relative to the lifting frame 22 in the direction towards the workpiece movement device 19. The blank sheet 14 slides during this workpiece transfer movement over the additional support portion 10 and is inserted with the leading edge thereof in the movement direction into the opened clamping claws 20 of the workpiece movement device 19 and thereby transferred to the workpiece movement device 19 (FIG. 9). The clamping claws 20 are closed and consequently the blank sheet 14 is fixed to the workpiece movement device 19 in a clamping manner. The suction cups 21 of the suction frame 12 are switched into a pressure-free state and the suction frame 12 releases the blank sheet 14. The additional support portion 10 which is arranged as before in the receiving position in the loading region 2 of the laser cutting machine 1 is now loaded with the blank sheet 14.

Figure 10:
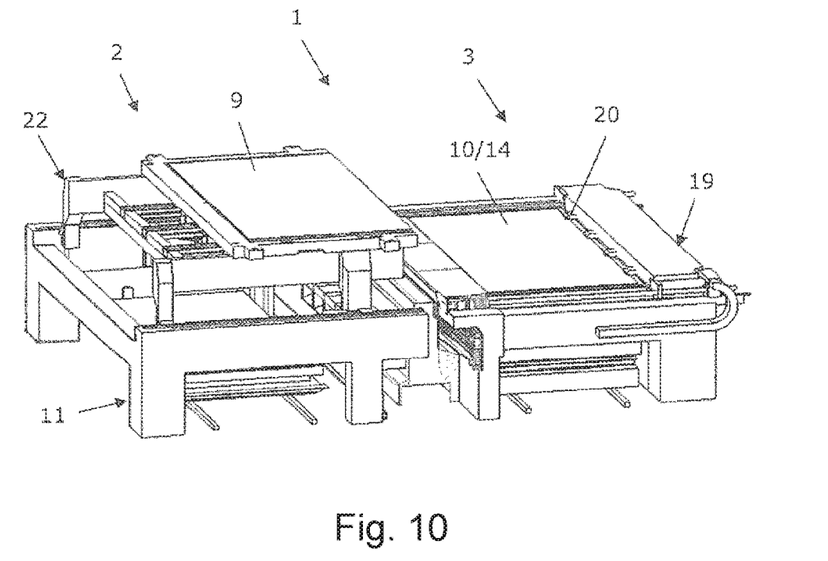

The additional support portion 10, which is loaded with the blank sheet 14, moves in the x direction from the receiving position in the loading region 2 into the unloading region 3 of the laser cutting machine 1 (FIG. 10). The additional support portion 10 does not change its height position during the movement in the x direction. Also in the unloading region 3, the additional support portion 10 is consequently arranged at the loading level.

At the same time as the additional support portion 10 and the blank sheet 14 which is supported on the additional support portion 10, the workpiece movement device 19 moves in the x direction. During this displacement movement, the workpiece movement device 19 acts as a workpiece retention device which secures the blank sheet 14 with which the additional support portion 10 is loaded against unintentional displacement relative to the additional support portion 10.

Figure 11:
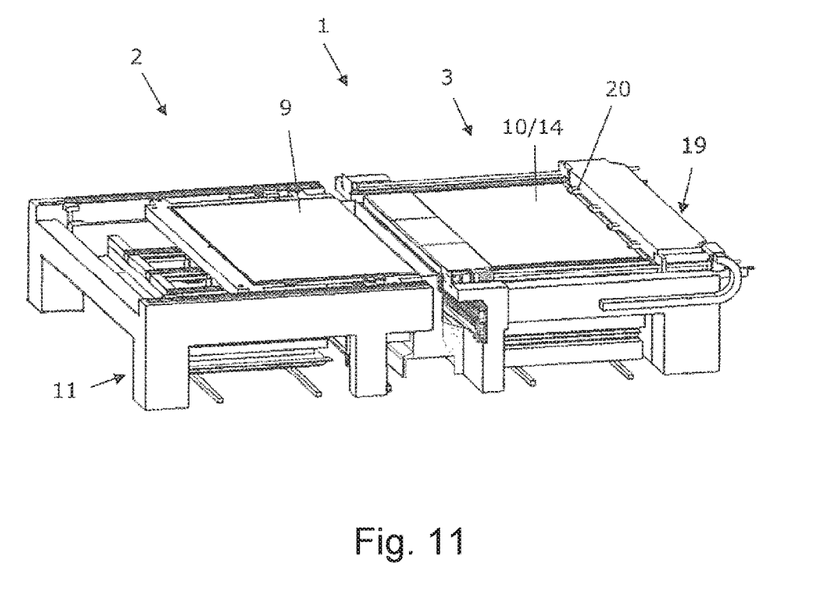

After the additional support portion 10 with the blank sheet 14 has left the region below the loading-side support portion 9 and the suction frame 12, the lifting frame 22 is lowered from the position of FIG. 10 until the loading-side support portion 9 is again positioned on the frame-like carrier structure 11 (FIG. 11). Consequently, the loading-side support portion 9 is also arranged on a loading level.

Figure 12:
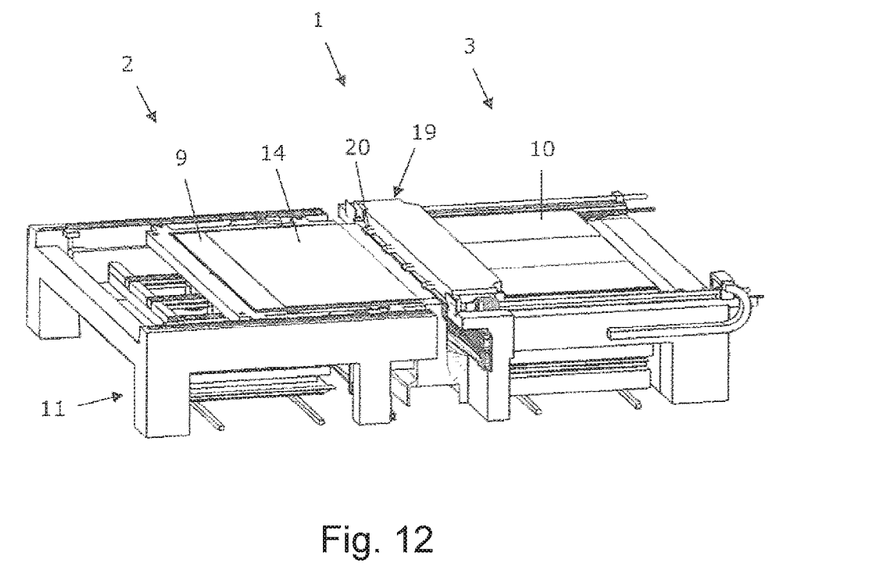

The additional support portion 10, which is loaded with the blank sheet 14 and which is arranged in the unloading region 3 on the loading level, and the loading-side support portion 9, which is arranged on the loading level, are located beside each other and are in alignment with each other at the upper side thereof in a horizontal direction in such a manner that the blank sheet 14 can be moved by the workpiece movement device 19 with a horizontal movement over the additional support portion 10 and the loading-side support portion 9. With such a movement, the blank sheet 14 is transferred by the workpiece movement device 19 to the loading-side support portion 9 (FIG. 12). Thus, the loading operation on the workpiece support 8 of the laser cutting machine 1 is completed.

Since the loading level of the loading-side support portion 9 and the additional support portion 10 are both at the operating level, the processing of the blank sheet 14 by the laser cutting head 7 can begin immediately after the transfer of the blank sheet 14 onto the loading-side support portion 9. For processing purposes, the blank sheet 14 is moved by the workpiece movement device 19 in the x direction relative to the laser cutting head 7. Processing movements in the y direction are carried out by the laser cutting head 7 which for this purpose moves along the portal carrier 6 of the portal-like guiding structure 5.

During the processing of the blank sheet 14, completed components that are not shown in the illustrated example are cut out. After the processing operation has been completed, the finished components are removed from the workpiece support 8 (not shown). There remains on the workpiece support 8 as a workpiece remainder or skeleton 18, which is secured by the clamping claws 20 to the workpiece movement device 19.

Figure 13:
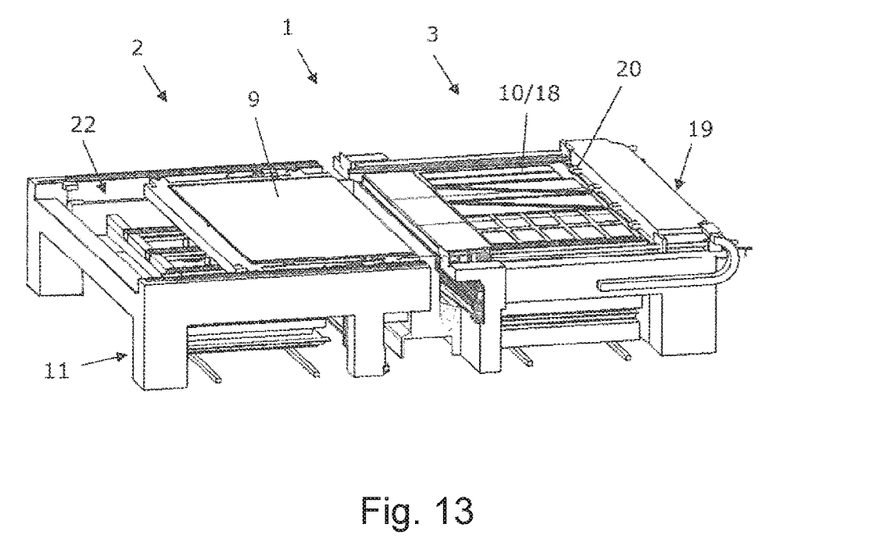
FIGS. 13 to 17 show the unloading of the workpiece support of the laser cutting machine of FIG. 1.

During the processing of the blank sheet 14, the additional support portion 10 retains its position in the unloading region 3 of the laser cutting machine 1. During the processing operation, the blank sheet 14 is moved by the workpiece movement device 19 also over the additional support portion 10. After the workpiece processing operation is complete, the workpiece movement device 19 moves with the skeleton 18 over the additional support portion 10 into a position close to the rear free end of the frame-like carrier structure 11. The skeleton 18 now rests completely on the additional support portion 10. The position in which the additional support portion 10 is arranged in the unloading region 3 forms an unloading starting position of the additional support portion 10 (FIG. 13).

While the workpiece movement device 19 moves the blank sheet 14 for processing purposes over the workpiece support 8, at the lower side of the loading-side support portion 9 the suction frame 12 is moved by a corresponding lowering movement of the lifting frame 22 relative to the loading-side support portion 9 onto the lower lifting level. In the manner described above with reference to FIGS. 2 and 3, the blank sheet 14, which is now located uppermost on the blank sheet pallet 13, is drawn in by the suction cups 21 of the suction frame 12 which is lowered to the lower lifting level (FIG. 14).

Figure 14:
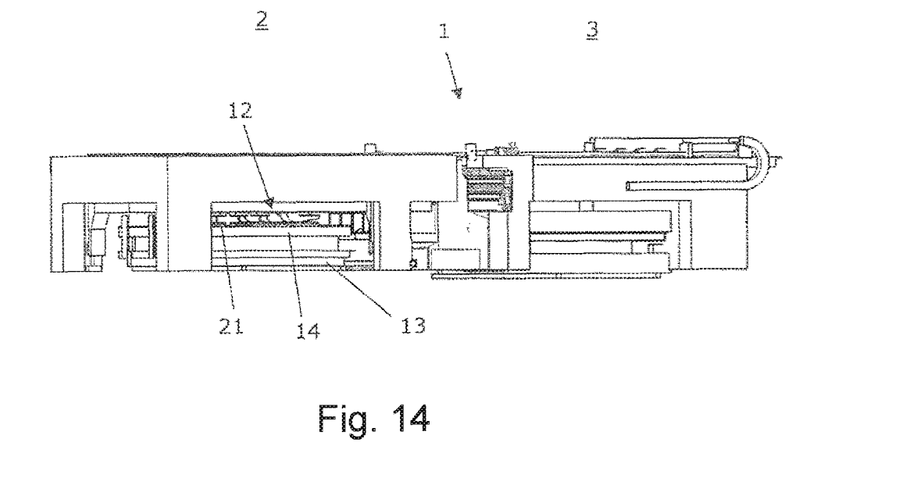
Figure 15:
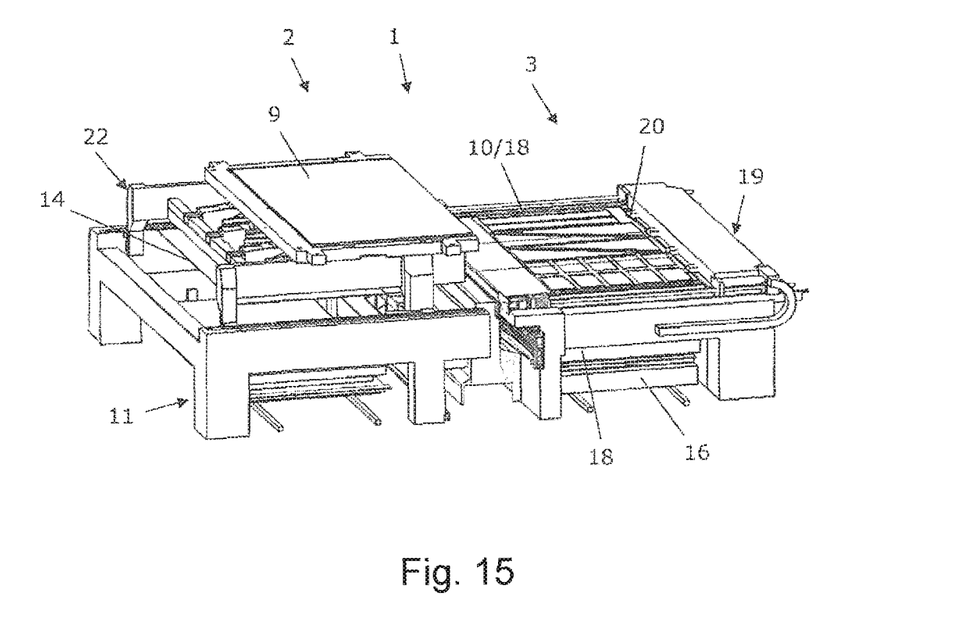

When the processing of a blank sheet 14 is complete and the skeleton 18 that has been produced during the workpiece processing operation has been transferred completely to the additional support portion 10 (FIG. 13), the suction frame 12 and the new blank sheet 14 that is retained thereon are lifted by the lifting frame 22 from the lower lifting level of FIG. 14 to the upper lifting level. At the upper lifting level, the suction frame 12 and the new blank sheet 14 are arranged above the additional support portion 10 which is located as before in the unloading region 3 of the laser cutting machine 1. The loading-side support portion 9 is lifted to the bypass level. In the loading region 2 of the laser cutting machine 1, the relationships of FIG. 15 are consequently produced and, thus, those relationships which have been described in detail above in connection with FIG. 4.

In the unloading region 3 of the laser cutting machine 1, the additional support portion 10 is located in the unloading starting position. The skeleton 18, which is supported on the additional support portion 10, is fixed to the workpiece movement device 19 by the clamping claws 20.

Starting from this configuration, the additional support portion 10 moves with an unloading movement in the x direction from the unloading starting position into the loading region 2 and at that location into the receiving position below the loading-side support portion 9 and the new blank sheet 14 which is retained on the suction frame 12. The workpiece movement device 19 to which the skeleton 18 is secured by the clamping claws 20 does not change its position in the x direction during the unloading movement of the additional support portion 10.

Figure 16:
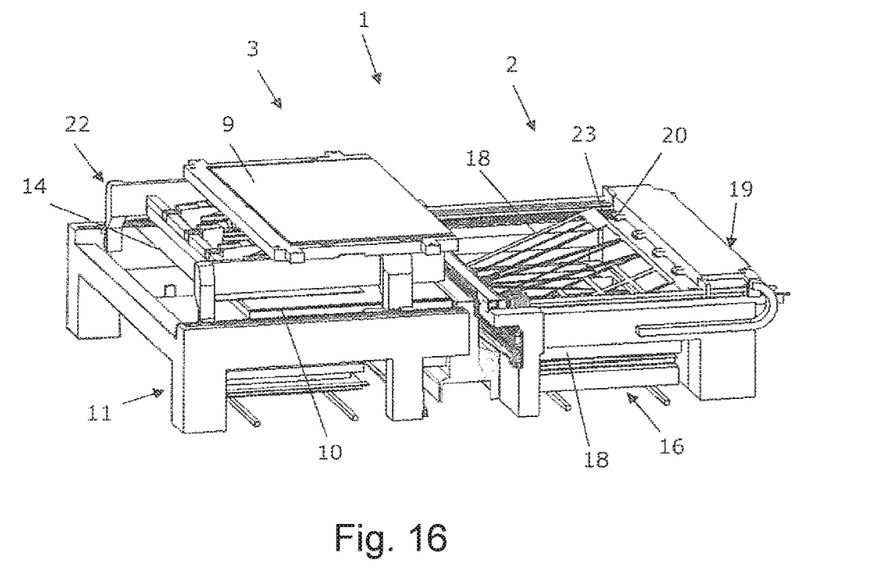
Figure 17:
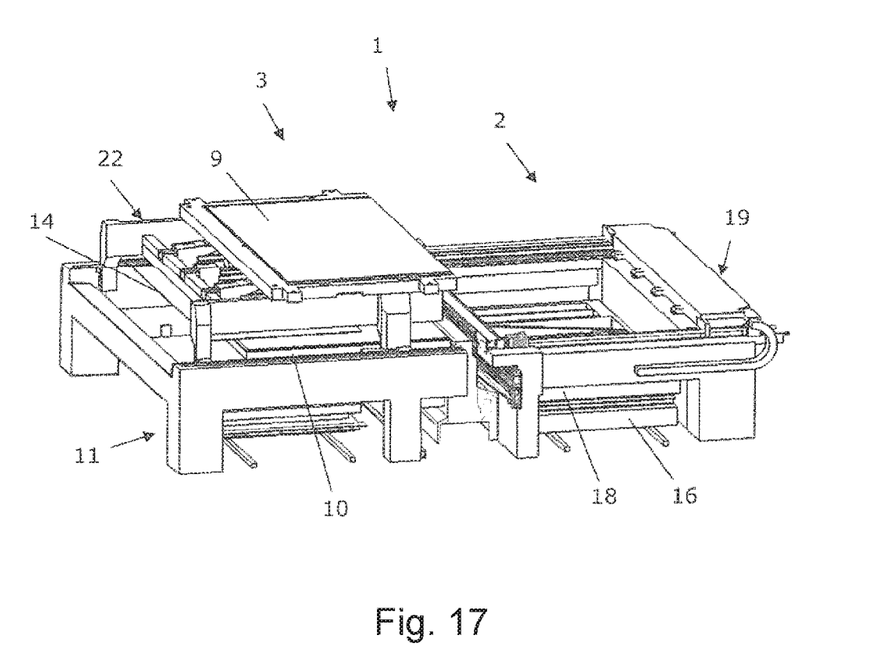

During the unloading movement from the unloading region 3 into the loading region 2, the additional support portion 10 consequently moves relative to the skeleton 18 and the workpiece movement device 19, which is now acting as a product retention device. As soon as the additional support portion 10 has moved out from below the skeleton 18, the skeleton 18 is deposited with the end located towards the loading region 3 under the action of gravitational force on the skeleton stack on the skeleton pallet 16. The clamping claws 20 of the workpiece movement device 19 are now opened and the workpiece movement device 19 carries out a short stroke movement in the x direction towards the free end of the frame-like carrier structure 11. The skeleton 18 does not move together with the workpiece movement device 19, but instead abuts a product stop 23 that acts as an auxiliary unloading device and that is provided on the frame-like carrier structure 11. As a result of the movement carried out by the workpiece movement device 19 relative to the skeleton 18, the skeleton 18 is released from the workpiece movement device 19 in an operationally reliable manner (FIG. 16). Under the effect of gravitational force, the skeleton 18 is now deposited completely on the skeleton pallet 16 (FIG. 17).

Thus, the unloading operation on the workpiece support 8 of the laser cutting machine 1 is consequently complete.

With the unloading movement of the additional support portion 10 from the unloading starting position in the unloading region 3 into the receiving position in the loading region 2 of the laser cutting machine 1, the next loading operation which is subsequently carried out as shown in FIGS. 6 to 11 is already initiated.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A machine tool for processing a workpiece, the machine tool comprising
   a workpiece movement device; and
   a workpiece support that supports both the workpiece during a processing operation and a workpiece remainder produced from the workpiece during the processing operation, wherein the workpiece support comprises a first support portion and an additional support portion;
   wherein the first support portion comprises a loading-side support portion arranged in a loading region of the machine tool;
   wherein the additional support portion is arranged to move relative to the loading-side support portion between the loading region and an unloading region of the machine tool, wherein the unloading region is offset in a horizontal direction from the loading region;
   wherein the loading-side support portion is arranged to move in a vertical direction between a loading level and a bypass level located above the loading level;
   wherein when the loading-side support portion is in the bypass level, the additional support portion is arranged to move into the loading region in a receiving position below the loading-side support portion for loading with the workpiece;
   wherein when loaded with the workpiece, the additional support portion is arranged to move on the loading level from the receiving position in the loading region into the unloading region;
   wherein when the additional support portion loaded with the workpiece and the loading-side support portion are both located on the loading level beside and in alignment with each other in the horizontal direction, the workpiece movement device is arranged to move the workpiece with a horizontal movement over the additional support portion and the loading-side support portion;
   wherein after the workpiece processing operation, the additional support portion is arranged in an unloading starting position in the unloading region to support the workpiece remainder; and
   wherein when the loading-side support portion is arranged on the bypass level, the additional support portion is arranged to move with an unloading movement from the unloading starting position in the unloading region into the receiving position in the loading region, leaving the workpiece remainder in the unloading region, thereby unloading the workpiece remainder.

2. The machine tool of claim 1, wherein the loading level corresponds to an operating level, and when at the operating level the additional support portion and the loading-side support portion are located beside and in alignment with each other such that the workpiece can be moved by the workpiece movement device to carry out a workpiece processing operation with a horizontal movement of the workpiece over the additional support portion and the loading-side support portion.

3. The machine tool of claim 1, wherein
   the loading-side support portion can be moved onto the bypass level above the loading level,
   the additional support portion can be moved into the receiving position below the loading-side support portion positioned at the bypass level, and
   a loading device, positioned between the loading-side support portion when positioned at the bypass level and the additional support portion positioned at the receiving position, is configured to load the workpiece on the additional support portion.

4. The machine tool of claim 3, comprising a workpiece store for at least one workpiece, the workpiece store being positioned below the loading-side support portion and below the additional support portion in the receiving position,
   wherein the loading device is adjustable in a vertical direction between a lower lifting level and an upper lifting level, wherein with the loading device at the upper lifting level the additional support portion can be moved into the receiving position below the loading device,
   wherein the workpiece can be picked up at the workpiece store by the loading device positioned on the lower lifting level, and
   wherein with the loading-side support portion at the bypass level, the loading device at the upper lifting level, and the additional support portion at the receiving position, the loading device can load the workpiece, picked up before at the workpiece store, on the additional support portion.

5. The machine tool of claim 4, wherein moving the loading-side support portion to the bypass level is caused by moving the loading device to the upper lifting level.

6. The machine tool of claim 5, wherein the loading-side support portion can be moved onto the bypass level by the loading device moving to the upper lifting level.

7. The machine tool of claim 1, comprising a workpiece retention device configured to secure the workpiece relative to the additional support portion during movement of the additional support portion from the receiving position into the unloading region.

8. The machine tool of claim 7, wherein the loading device is configured to transfer the workpiece to the workpiece retention device.

9. The machine tool of claim 7, wherein the workpiece movement device is the workpiece retention device.

10. The machine tool of claim 1, wherein a product retention device is provided by which product retention device the workpiece remainder, supported by the additional support portion in the unloading starting position, can be secured during the unloading movement of the additional support portion for remaining in the unloading region.

11. The machine tool of claim 10, further comprising an auxiliary unloading device configured to release the workpiece remainder from the product retention device after the unloading movement of the additional support portion.

12. The machine tool of claim 11, wherein the workpiece movement device is the product retention device.

13. The machine tool of claim 1, comprising a product store for at least one workpiece remainder which is unloaded as a result of the unloading movement of the additional support portion, the product store positioned below the additional support portion in the unloading starting position.

* * * * *